(12) United States Patent
Gajewski

(10) Patent No.: US 8,342,993 B2
(45) Date of Patent: Jan. 1, 2013

(54) SYNCHRONOUS DRIVE APPARATUS

(75) Inventor: Witold Gajewski, Richmond Hill, CA (US)

(73) Assignee: Litens Automotive Partnership, Woodbridge (CA)

( * ) Notice: Subject to any disclaimer, the term of this patent is extended or adjusted under 35 U.S.C. 154(b) by 310 days.

(21) Appl. No.: 12/645,230

(22) Filed: Dec. 22, 2009

(65) Prior Publication Data

US 2010/0160100 A1    Jun. 24, 2010

Related U.S. Application Data

(60) Continuation-in-part of application No. 11/577,236, filed as application No. PCT/CA2005/001615 on Oct. 21, 2005, now abandoned, application No. 12/645,230, which is a continuation-in-part of application No. 11/942,216, filed on Nov. 19, 2007, now Pat. No. 7,720,650, which is a division of application No. 11/491,994, filed on Jul. 25, 2006, now abandoned, which is a continuation of application No. 11/101,597, filed on Apr. 8, 2005, now Pat. No. 7,232,391, which is a division of application No. 10/294,933, filed on Nov. 15, 2002, now Pat. No. 7,044,875, application No. 12/645,230, which is a continuation-in-part of application No. 12/315,962, filed on Dec. 8, 2008, now Pat. No. 8,042,507, which is a continuation of application No. 10/571,737, filed as application No. PCT/CA2004/001642 on Sep. 20, 2004, now Pat. No. 7,493,880.

(60) Provisional application No. 60/621,508, filed on Oct. 22, 2004, provisional application No. 60/369,558, filed on Apr. 4, 2002, provisional application No. 60/333,118, filed on Nov. 27, 2001.

(51) Int. Cl.
| | |
|---|---|
| F16H 55/30 | (2006.01) |
| F16H 55/36 | (2006.01) |
| F16H 7/00 | (2006.01) |
| F16H 9/00 | (2006.01) |
| F16H 59/00 | (2006.01) |
| F16H 61/00 | (2006.01) |
| F16H 63/00 | (2006.01) |

(52) U.S. Cl. .......................... 474/141; 474/78; 474/148
(58) Field of Classification Search .................... 474/87, 474/148, 141

See application file for complete search history.

(56) References Cited

U.S. PATENT DOCUMENTS

| | | | |
|---|---|---|---|
| 571,086 A | 11/1896 | Fulton et al. | |
| 613,756 A | 11/1898 | Buddle | |
| 1,963,314 A | 6/1934 | Savell et al. | |
| 3,254,636 A * | 6/1966 | Faust ........................... | 123/78 D |
| 2,477,441 A | 4/1969 | Cole | |
| 3,583,250 A * | 6/1971 | Kongelka ..................... | 474/133 |
| 3,752,035 A | 8/1973 | Cozzy et al. | |

(Continued)

FOREIGN PATENT DOCUMENTS

CA         2463715         6/2003

(Continued)

Primary Examiner — Michael Mansen
Assistant Examiner — Henry Liu
(74) Attorney, Agent, or Firm — Harness, Dickey & Pierce, P.L.C.

(57) ABSTRACT

A synchronous drive apparatus that includes a continuous loop elongate drive structure and first and second driven rotors that are configured to cooperate with the continuous loop elongate drive structure to generate first and second opposing fluctuating corrective torques, respectively, that are configured to at least partly counteract first and second periodic fluctuating load torques, respectively.

17 Claims, 7 Drawing Sheets

U.S. PATENT DOCUMENTS

| | | | |
|---|---|---|---|
| 4,865,577 A * | 9/1989 | Freudenstein | 474/141 |
| 5,178,108 A * | 1/1993 | Beaber | 123/90.31 |
| 5,386,808 A * | 2/1995 | Koch | 123/90.31 |
| 5,549,314 A * | 8/1996 | Sassi et al. | 280/259 |
| 5,882,025 A | 3/1999 | Runnels | |
| 6,213,905 B1 * | 4/2001 | White et al. | 474/148 |
| 6,298,812 B1 * | 10/2001 | Izuo et al. | 123/90.11 |
| 6,763,792 B2 * | 7/2004 | Okamoto | 123/90.31 |
| 6,877,467 B2 * | 4/2005 | Katayama | 123/90.17 |
| 7,044,875 B2 * | 5/2006 | Gajewski | 474/148 |
| 7,125,356 B2 * | 10/2006 | Todd | 474/152 |
| 2003/0087714 A1 * | 5/2003 | Todd | 474/156 |
| 2003/0104886 A1 * | 6/2003 | Gajewski | 474/87 |

FOREIGN PATENT DOCUMENTS

CA 2480440 10/2003

\* cited by examiner

SYNCHRONOUS DRIVE APPARATUS

CROSS-REFERENCE TO RELATED APPLICATIONS

This application is a continuation-in-part of U.S. patent application Ser. No. 11/577,236 filed Apr. 13, 2007, which is a National Stage of International Application No. PCT/CA05/01615, filed Oct. 21, 2005, which claims priority to U.S. Provisional Patent Application No. 60/621,508 filed Oct. 22, 2004. This application is also a continuation-in-part of U.S. patent application Ser. No. 11/942,216 filed Nov. 19, 2007, which is a division of U.S. patent application Ser. No. 11/491,994 filed Jul. 25, 2006 (now abandoned), which is a continuation of U.S. patent application Ser. No. 11/101,597 filed Apr. 8, 2005 (now U.S. Pat. No. 7,232,391), which is a division of U.S. patent application Ser. No. 10/294,933 filed Nov. 15, 2002 (now U.S. Pat. No. 7,044,875), which claims the benefit of U.S. Provisional Patent Application Ser. No. 60/369,558 filed Apr. 4, 2002 and U.S. Provisional Patent Application Ser. No. 60/333,118 filed Nov. 27, 2001. This application is also a continuation-in-part of U.S. patent application Ser. No. 12/315,962 filed Dec. 8, 2008, which is a continuation of U.S. patent application Ser. No. 10/571,737, filed Mar. 16, 2006 (now U.S. Pat. No. 7,493,880), which is a National Stage of International Application No. PCT/CA2004/001642 filed Sep. 20, 2004. The entire disclosures of U.S. patent application Ser. No. 11/942,216 and U.S. patent application Ser. No. 12/315,962 are incorporated herein by reference.

INTRODUCTION

The present disclosure generally relates to a synchronous drive apparatus.

Synchronous drive systems, such as timing belt-based systems, are widely used in motor vehicles, as well as in industrial applications. In motor vehicles, for example, timing belts or chains are used to drive the camshafts that open and close the engine intake and exhaust valves. Also other devices such as water pumps, fuel pumps etc. can be driven by the same belt or chain.

Internal combustion engines produce many types of mechanical vibrations during their operation, and these vibrations are usually transmitted through the timing belt or chain in the synchronous drive system. A particularly intense source of mechanical vibrations is given by the intake and exhaust valves and the camshafts that open and close those intake and exhaust valves. Opening and closing the intake and exhaust valves leads to a type of vibration known as torsional vibration. When the frequency of these vibrations is close to natural frequency of the drive, system resonance occurs. In resonance the torsional vibrations and the span tension fluctuations are at their maximum.

As flexible mechanical structures, timing belts and chains are particularly susceptible to the deleterious effects of mechanical vibrations. Mechanical vibrations transmitted through the timing belt or chain cause fluctuations in belt or chain tension, which can lead to increased wear and reduced belt or chain life. Vibrations may also cause timing errors, and result in undesirable amounts of noise.

Conventional techniques to attenuate the vibrations include increasing the tension on the belt or chain and installing camshaft dampers. Camshaft dampers connect a source of inertia to a camshaft sprocket by a vibration-absorbing rubber or silicone. However, increasing the belt or chain tension increases the noise level and reduces the useful life of the belt or chain. Installing camshaft dampers is also an undesirable solution, because of their cost and/or because of lack of space.

In DE-A-195 20 508 (Audi AG), there is disclosed a wrapped belt drive for an internal combustion engine, the timing belt being wrapped around two driven pulleys coupled to the camshaft of the engine, and one drive pulley coupled to the crankshaft of the engine. The objective of the invention is to counter the torsional vibrations which are found in such belt drives. It is proposed to provide an additional torsional vibration through which the critical resonance can be moved to a range where it can either be tolerated, or does not arise. It is proposed in the citation to produce torsional vibrations by an "out of round" pulley, which is shown as consisting of one of the camshaft pulleys. The out of round pulley which is shown has four protruding portions and four receding portions arranged regularly around the pulley. It is said that the variations in the pulley profile introduce torsionals to the timing belt at the incoming or outgoing spans of the driven pulleys, which are superimposed on the dynamics of the combustion engine, and thus shift or eliminate the critical resonance range. A figure is shown which is said to show a graph of torsional vibrations of the timing drive in degrees camshaft over the RPM of the crankshaft. The total amplitude is shown, and also the dominant vibration of the second order and the less relevant vibrations of the fourth order are shown. A single example of a magnitude of eccentricity of an out of round pulley is given, but no teaching is given as to how to select the magnitude of the eccentricity, and the angular alignment of the out of round rotor relative to the other rotors, for any given conditions of type of engine, type of drive belt, and type of load. As has been mentioned, the objective of the invention in the citation is to counter the torsional vibrations in the belt drive, and not to deal with the source of the vibrations.

In Japanese Utility Model JP 62-192077 (Patent Bulletin No. HEI 1-95538) of 1987 (Hatano et al/Mitsubishi), there is disclosed a tension equalizing driving device which transmits the rotation of a drive pulley to a driven pulley by a belt drive such as a timing belt in an internal combustion engine. There is shown a timing belt arrangement in which a toothed pulley of the drive shaft of a camshaft is driven by an oval timing belt driving sprocket connected to the drive shaft of an internal combustion engine. The teaching of the citation is that the drive pulley is made oval in shape so as to give the drive belt a tension fluctuation with a phase opposite to that of the tension fluctuation in the belt produced by the rotation of the internal combustion engine. It is said that the drive pulley is installed in such a way that it gives the drive belt a tension fluctuation with a phase opposite to that of the tension fluctuation of the belt already present. The oval drive sprocket is said to be a tension equalizing device, and is provided to equalize the tension in the drive belt. A figure is shown of a graph illustrating the tension caused by the valve train torque and the tension caused by the tension equalizing device (the oval drive sprocket), the two tensions being shown of the same magnitude and opposite phase. There is no specific teaching given as to how to determine the magnitude of the eccentricity of the oval drive pulley, nor how to relate the angular position of the drive pulley to the camshaft pulley which is driven by the belt. In addition, as discussed in Japanese Application No. HEI 9-73581 (Patent Bulletin No. HEI 10-266868) of 1997 (Kubo/Mitsubishi), it was subsequently determined by the Applicant in JP 62-192077 (HEI 1-95538) that the use of an oval sprocket as a crank sprocket has a number of difficulties and problems and is thus not desirable.

SUMMARY

This section provides a general summary of the disclosure, and is not a comprehensive disclosure of its full scope or all of its features.

In one form, the present disclosure provides a synchronous drive apparatus having a plurality of rotors and a continuous loop elongate drive structure. The plurality of rotors includes a driving rotor, a first driven rotor and a second driven rotor. The first driven rotor is configured to be coupled to a first shaft that when rotated is configured to transmit to the first driven rotor a first periodic fluctuating load torque. The second driven rotor is configured to be coupled to a second shaft that when rotated is configured to transmit to the second driven rotor a second periodic fluctuating load torque. The continuous loop elongate drive structure is engaged to the plurality of rotors to transmit rotary power from the driving rotor to the first driven rotor and the second driven rotor. The first driven rotor includes a first non-circular profile having a plurality of first lobes arranged about the first non-circular profile so as to cooperate with the continuous loop elongate drive structure to apply a first opposing fluctuating corrective torque to the first driven rotor that at least partly counteracts the first periodic fluctuating load torque. The second driven rotor comprises a second non-circular profile having a plurality of second lobes arranged about the second non-circular profile so as to cooperate with the continuous loop elongate drive structure to apply a second opposing fluctuating corrective torque to the second driven rotor that at least partly counteracts the first periodic fluctuating load torque. The first non-circular profile is different from the second non-circular profile.

In another form, the present disclosure provides a synchronous drive apparatus that includes a housing structure, a driving rotor, a plurality of driven rotors, a continuous loop elongate drive structure and a plurality of shafts. The continuous loop elongate drive structure is engaged to the driving rotor and the plurality of driven rotors to transmit rotary power from the driving rotor to the plurality of driven rotors. The plurality of shafts is mounted to the housing structure for rotation about respective rotational axes. Each of the shafts is coupled to an associated one of the driven rotors for rotation therewith. Rotation of each of the shafts transmits to its associated driven rotor a corresponding periodic fluctuating load torque. Each of the associated ones of the driven rotors is configured to cooperate with an adjacent span of the continuous loop elongate drive structure to produce a periodic fluctuating corrective torque that is configured to at least partly counteract the corresponding periodic fluctuating load torque.

In another form, the present disclosure provides a vibration canceling sprocket for an element to rotate at one half the speed of another element in a synchronous drive, the sprocket comprising: a number of teeth about the periphery of the sprocket, the teeth being operable to engage an interconnecting member of the synchronous drive, the teeth being arranged in three identical lobes about the periphery of the sprocket and wherein each lobe has some teeth being located above a reference circular radial profile for the sprocket and some teeth being located below the reference circular radial profile to create a desired three-lobed non-circular profile for the sprocket, wherein the shape of the three-lobed non-circular profile is selected to produce a corrective torque in the interconnecting member of the synchronous drive to reduce 1.5 order vibrations in the synchronous drive.

The vibration canceling sprocket may further include a six-lobed non-circular radial profile overlaid on the three-lobed non-circular radial profile of the sprocket to produce a non-circular composite radial profile for the sprocket, wherein the shape of the composite non-circular radial profile is selected to produce corrective torques in the interconnecting member of the synchronous drive to reduce 1.5 order and $3^{rd}$ order vibrations in the synchronous drive.

In yet another form, the present disclosure provides a synchronous drive having at least two rotating elements connected by an interconnecting means and wherein one of the at least two elements rotates at one half the speed of another of the at least two rotating elements, the drive comprising: an interconnecting means; a sprocket connected to the one element of the at least one rotating elements which rotates at one half speed, the sprocket operable to engage the interconnecting means to rotate the one element, the sprocket having a three-lobed non-circular radial profile which engages the interconnecting means; a sprocket connected to another of the at least two rotating elements and being operable to engage the interconnecting means to rotate the connected element, wherein the three-lobed non-circular radial profile of the sprocket connected to the one element is selected to produce a corrective torque in the interconnecting member of the synchronous drive to reduce 1.5 order vibrations in the synchronous drive.

If more than one element rotates at one half the speed of another element in the drive, the sprocket for each one half speed rotating element can have three lobes to reduce 1.5 order vibrations in the synchronous drive. If desired, the three-lobed non-circular profile of the sprocket can be overlaid with a further second profile having six lobes to form a composite non-circular profile for the sprocket, the composite profile being selected to produce corrective torques in the interconnecting member of the synchronous drive to reduce 1.5 order and $3^{rd}$ vibrations in the synchronous drive.

In still another form, the present disclosure provides a vibration canceling sprocket and a synchronous drive employing such sprockets wherein 1.5 order vibrations in the synchronous drive can be reduced by employing the vibration canceling sprocket on a rotating member of the synchronous drive that rotates at one half the speed of another rotating member of the drive. To cancel 1.5 order vibrations, the sprocket has a three-lobed non-circular radial profile to engage the interconnecting member of the synchronous drive. To cancel 1.5 order and $3^{rd}$ order vibrations, the sprocket has a composite non-circular radial profile to engage the interconnecting member. The interconnecting member can be a chain or a toothed belt.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION OF THE VARIOUS EMBODIMENTS

Figure 1:
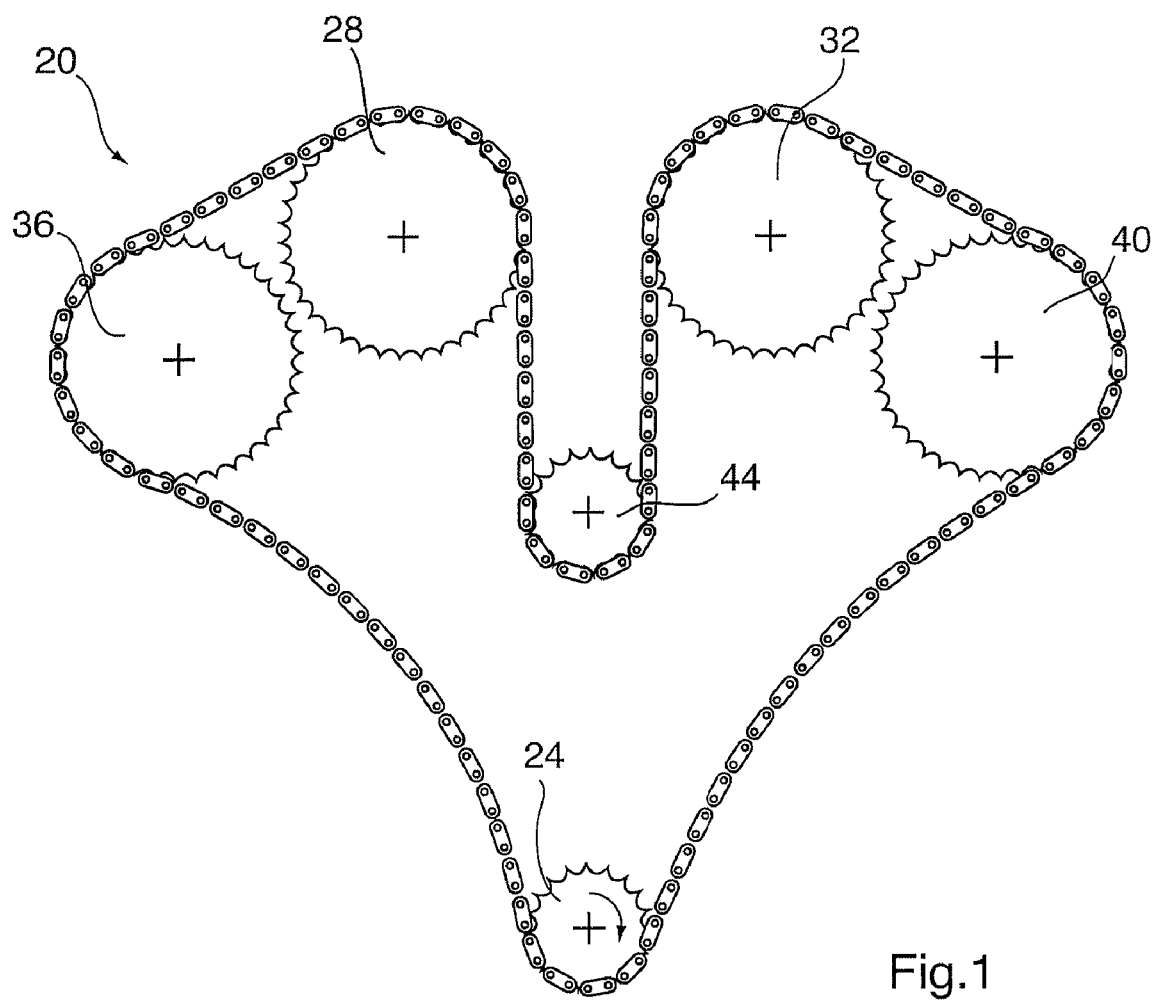
FIG. 1 shows a single chain synchronous drive for a V6 engine in which each bank of the engine has an inlet camshaft rotor and an exhaust camshaft rotor.

A synchronous drive, in accordance with an embodiment of the present invention, is indicated generally at 20 in FIG. 1. Drive 20 includes a driven sprocket 24, which is mounted to the crankshaft of an internal combustion engine, a pair of inlet camshaft sprockets 28 and 32, a pair of exhaust cam shaft sprockets 36 and 40 and an idler shaft sprocket 44, all of which are interconnected by roller chain 48.

While, in the embodiment of FIG. 1, synchronous drive 20 employs an endless roller chain 48 to interconnect the sprockets, it will be apparent to those of skill in the art that drive 20 could instead employ a toothed belt or any other suitable endless means of interconnecting the sprockets, provided only that the sprockets are appropriately formed to engage the interconnecting means. Accordingly, as used herein, the term "sprocket" is intended to encompass both sprockets for endless chain drives and sprockets for endless toothed belt drives. Further, in the following discussion the term "tooth" is intended to encompass both the drive engaging elements of sprockets for chain drives and the belt tooth engaging structures on sprockets for toothed belts.

FIG. 1 is intended merely to be an illustrative example of a synchronous drive in accordance with the present invention. As will be apparent to those of skill in the art, a variety of other configurations of synchronous drives susceptible to non-integer orders of resonance are possible and can be addressed by the present invention.

Figure 2:
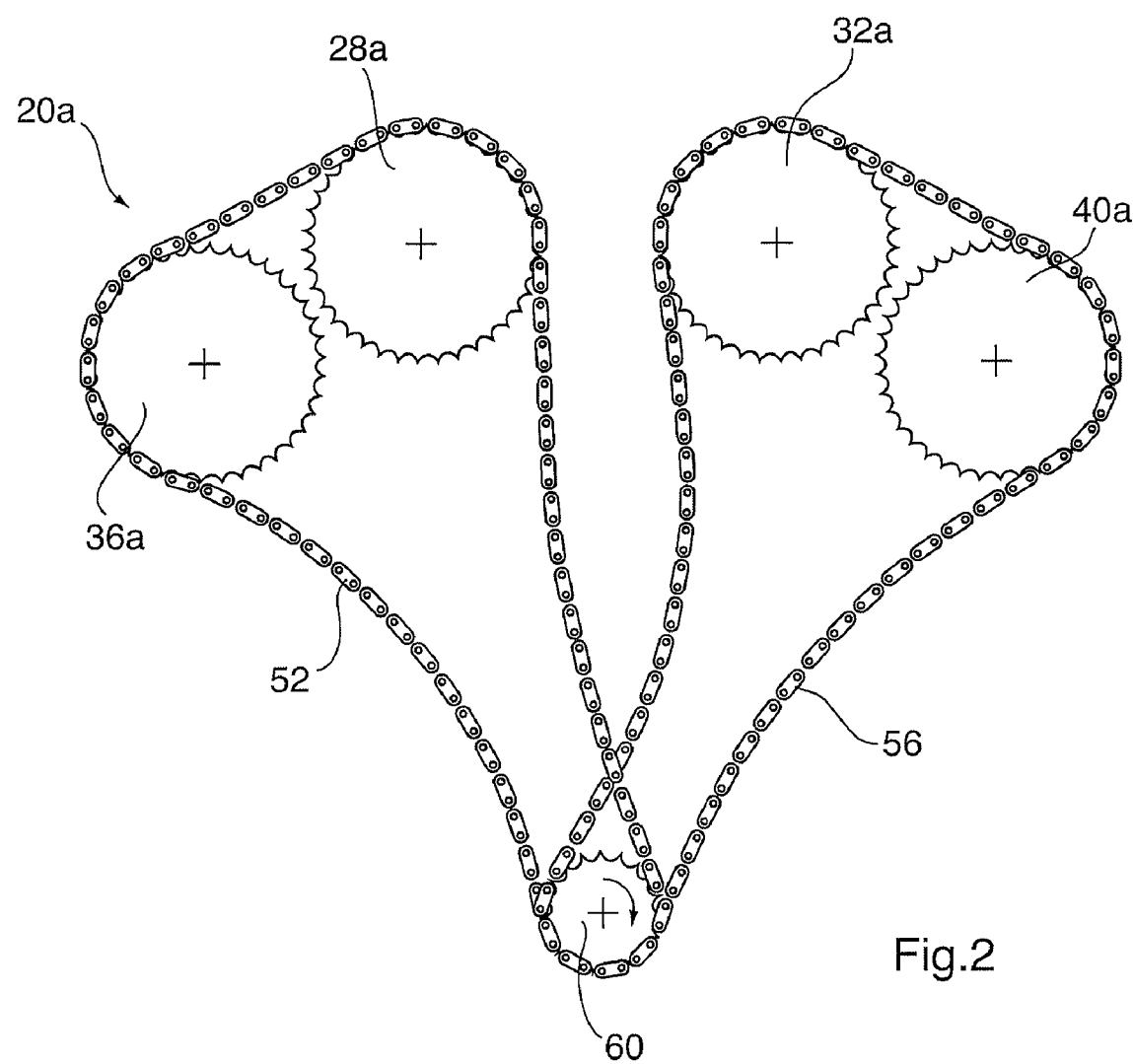
FIG. 2 is a shows a dual chain synchronous drive for a V6 engine in which each bank of the engine has an inlet camshaft rotor and an exhaust camshaft rotor.

For example, while FIG. 1 shows one configuration of a synchronous drive for a V6 engine employing a single chain, FIG. 2 shows another configuration of a V6 synchronous drive wherein two roller chains are employed. In FIG. 2 components which are similar to those of FIG. 1 are identified with the same reference numerals with an "a" appended.

In FIG. 2, drive 20a includes two chains 52 and 56, each of which drives the camshaft sprockets on a respective bank of the V6 engine and no idler sprocket is required. Specifically, chain 52 drives inlet camshaft sprocket 28a and exhaust camshaft sprocket 36a while chain 56 drives inlet camshaft sprocket 32a and exhaust camshaft sprocket 40a. Each of chains 52 and 56 are driven by a respective set of teeth on a driven double-sprocket 60, which is mounted on the crankshaft of the engine. Many other configurations of synchronous drive are possible, including staged drives, etc. and non-integer order resonance in such configurations can also be addressed by the present invention.

Figure 3:
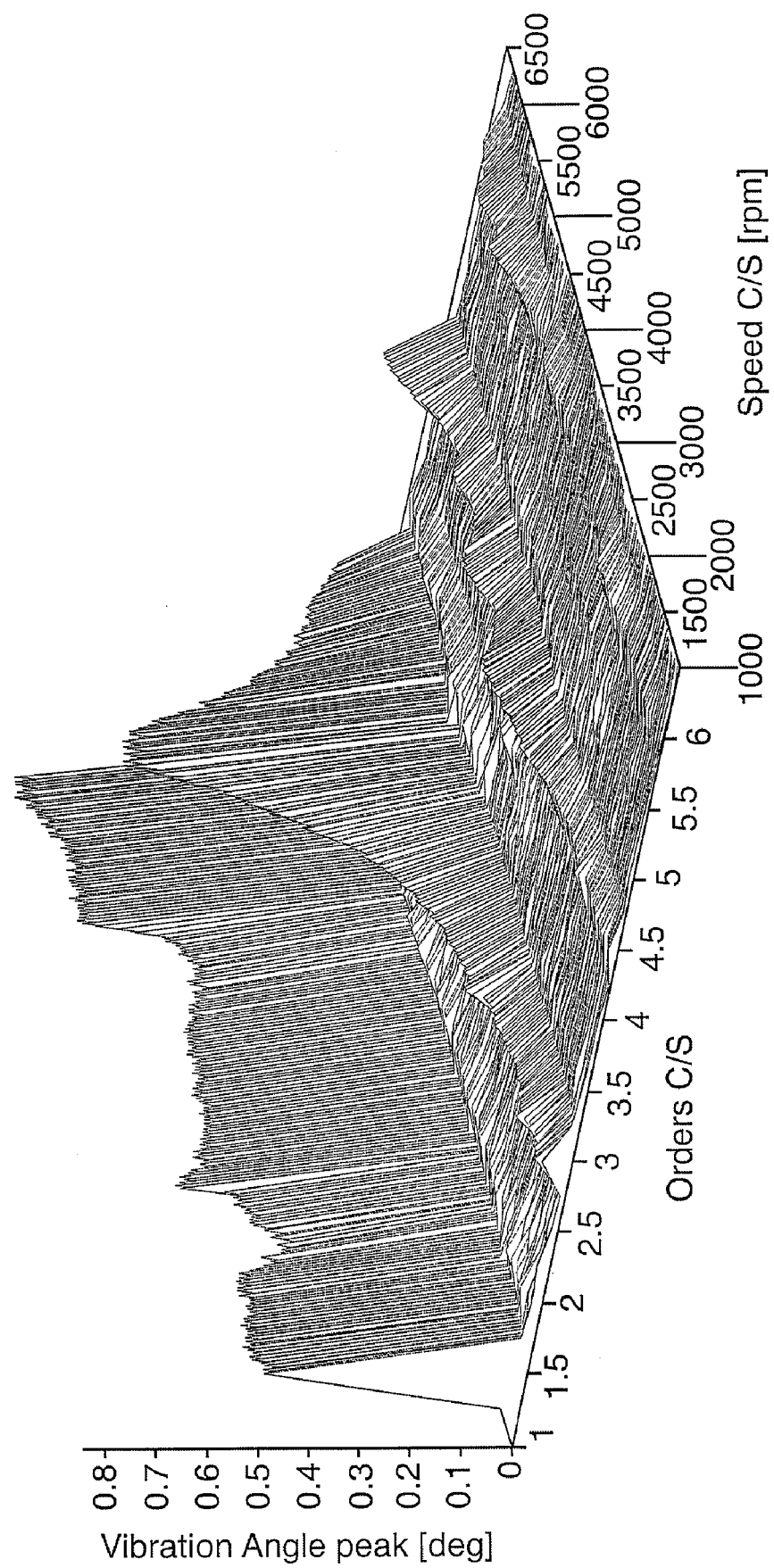
FIG. 3 shows a Fourier Waterfall graph of the torsional vibrations at a camshaft of a typical prior art synchronous drive for a V6 engine.

FIG. 3 shows a Fourier Waterfall graph of the torsional vibrations at a camshaft of a typical prior art synchronous drive of a V6 engine. The high levels of torsional vibration experienced at the 1.5 crankshaft order and, to a lesser extent, the $3^{rd}$ order resonance points is apparent (in this Figure "Speed" refers to the crankshaft speed).

Figure 4:
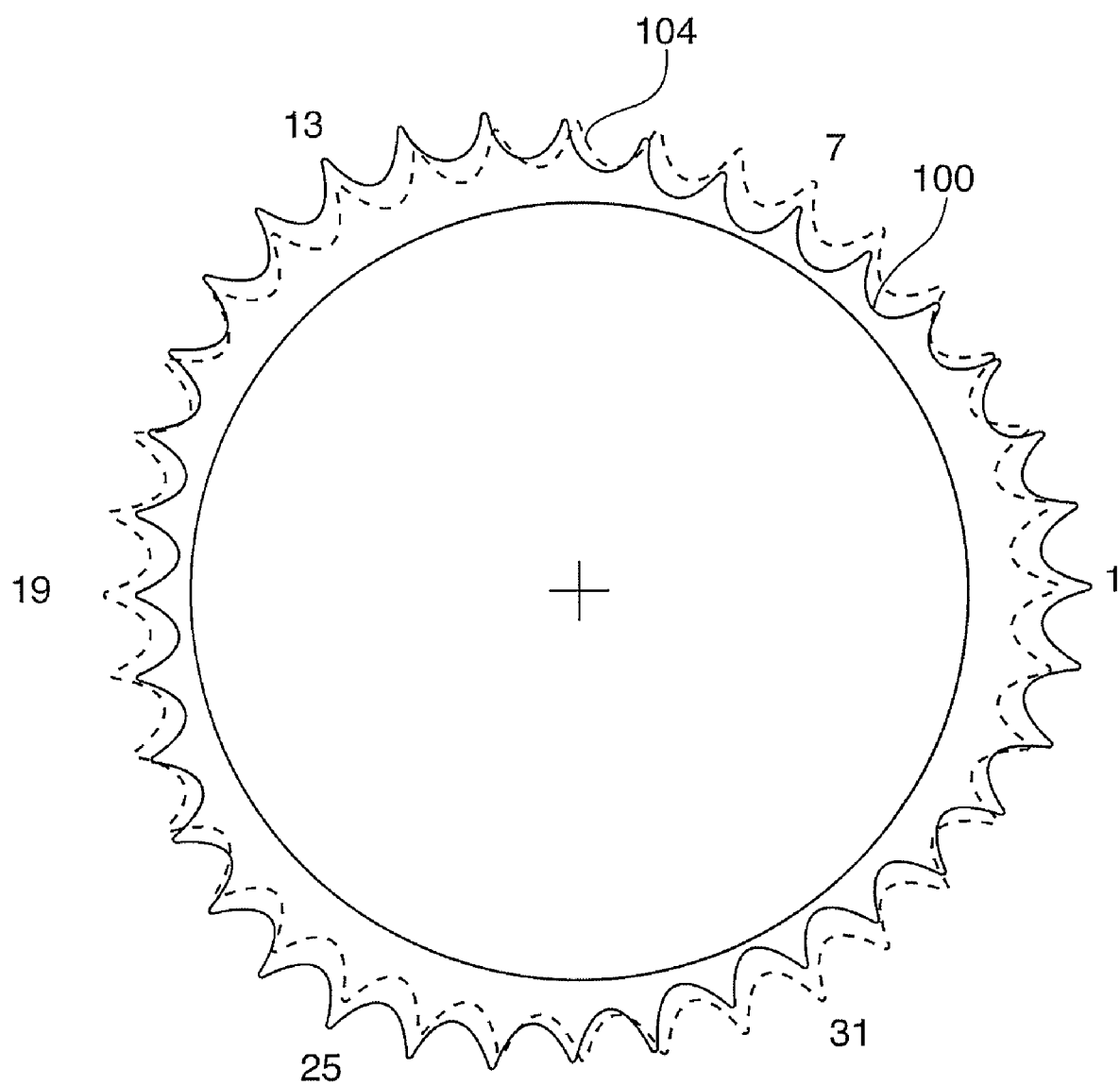
FIG. 4 shows the profile of the teeth of a sprocket in accordance with the present invention overlaid on the profile of the teeth a conventional sprocket.
Figure 5:
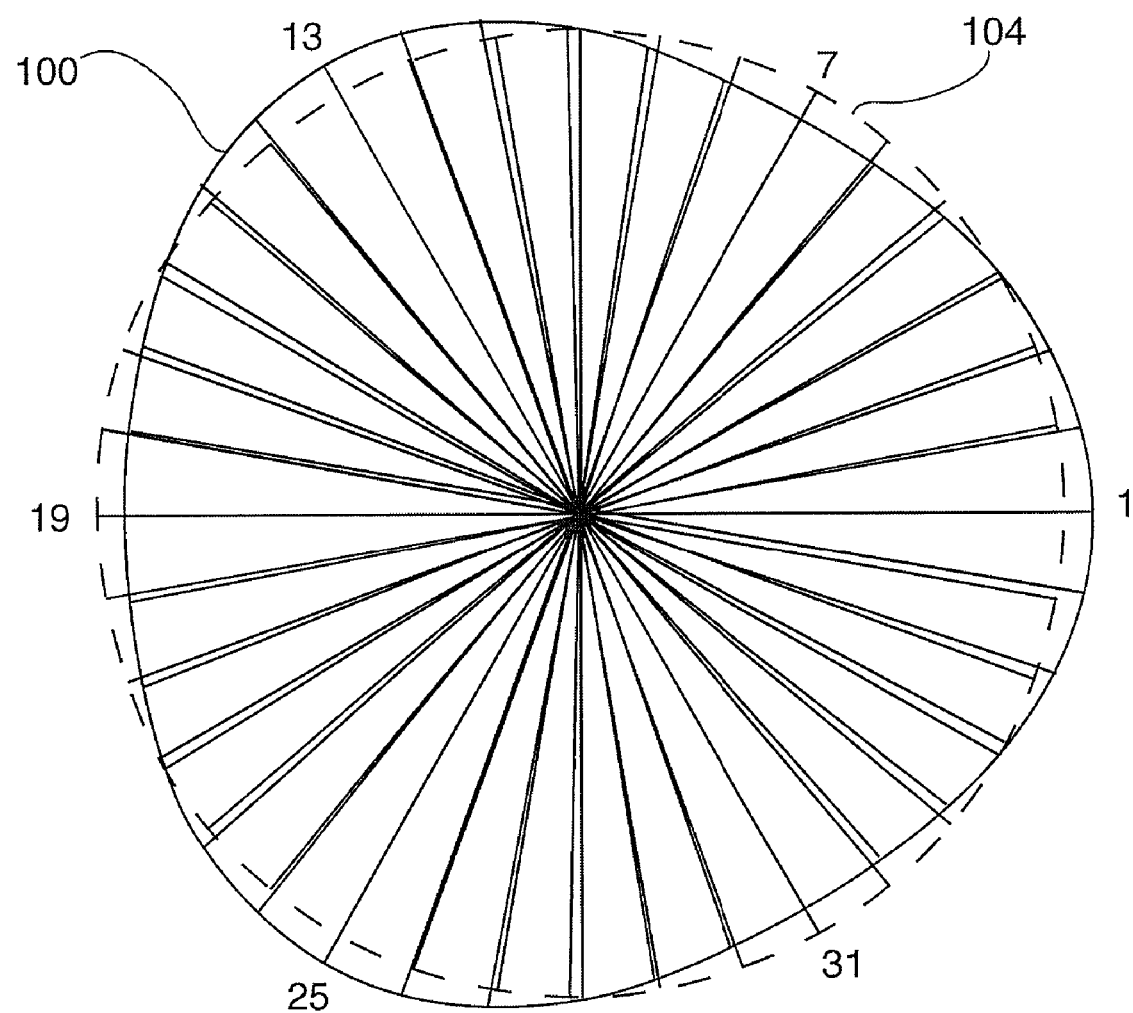
FIG. 5 shows the outline of the profiles of the sprockets of FIG. 4 and indicators of the mid points of their respective teeth.

FIG. 4 shows the non-circular radial profile of the teeth of a thirty-six tooth sprocket 100, shown in solid line, constructed in accordance with the present invention. In the Figure, the inventive sprocket 100 is overlaid on the circular radial profile of the teeth of a conventional thirty-six tooth sprocket 104, shown in dashed line. FIG. 5 shows the radial profile outline of the two sprockets of FIG. 4, with radial lines showing the relative positions of the mid points of the sprocket teeth for each sprocket. The radial profile outline of sprocket 100 is shown in solid line and the profile outline of conventional sprocket 104 is shown in dashed line.

As illustrated in the Figures, conventional sprocket 104 has a circular radial profile while the sprocket 100 constructed in accordance with the present invention has a radial profile which is non-circular with three repeated lobes (it should be noted that, for clarity, the magnitude of the non-circularity of the profile has been exaggerated in the Figures). Specifically, the profile of the first lobe, from the tooth numbered 1 to the tooth numbered 13, is repeated for a second lobe from the tooth numbered 13 to the tooth numbered 25 and for a third lobe from the tooth numbered 25 to the tooth numbered 1.

The profile of the first lobe has a "high" point at each end (at tooth 1 and at tooth 13) where the profile is radially above/outside the profile of circular conventional sprocket 104 and has a "low" point at it's mid point (at tooth 7) where the profile is radially below/inside the profile of circular conventional sprocket 104. Each of the repeated second and third lobes have the same high points at corresponding locations, specifically at teeth 13 and 25 for the second lobe and at teeth 25 and 1 for the third lobe, and have the same low point at corresponding locations, specifically at tooth 13 for the second lobe and at tooth 31 for the third lobe.

Sprocket 100 can be designed in accordance with the principles described in the above-mentioned published PCT application. By utilizing sprocket 100 at a camshaft, the corrective torque created by the non-circular profile of sprocket 100 is applied to the chain at a speed one half the speed of the crankshaft, thus allowing 1.5 order resonances (and multiples thereof) to be reduced.

In the synchronous drive 20 of FIG. 1 for a V6 engine, it has been found that replacing at least one of the camshaft sprockets 28, 32, 36 or 40 with a properly designed sprocket 100 can reduce 1.5 order torsional vibrations in the synchronous drive 20.

In the synchronous drive 20a of FIG. 2 for a V6 engine, it has been found that by replacing at least one of camshaft sprockets 28a and 36a and one of camshaft sprockets 32a and 40a can reduce 1.5 order torsional vibrations in the synchronous drive 20a.

However, it is further preferred that each camshaft sprocket in synchronous drives 20 and 20a be replaced with appropriately designed sprockets 100 to obtain a further reduction in 1.5 order torsional vibrations in the respective synchronous drives.

It is believed that the application of the corrective torque, which results from the non-circular profile of sprocket 100, at the point wherein the torque causing the torsional vibration is produced provides the best correction, and thus reduction, of 1.5 order torsional vibrations. Thus, replacing each conventional sprocket with an appropriately designed sprocket 100 in accordance with the present invention is preferred.

Accordingly, in drive 20 of FIG. 1, each of camshaft sprockets 28, 32, 36 and 40 are preferably each replaced with appropriate sprockets 100 and in drive 20a of FIG. 2, each of camshaft sprockets 28a, 32a, 36a and 40a are preferably each replaced with appropriate sprockets 100.

As will be apparent to those of skill in the art, in designing sprocket 100 for synchronous drives wherein multiple sprockets 100 are to be employed as camshaft sprockets, the design of each sprocket 100 is performed for the span immediately following it. In other words, in a DOHC engine such as FIG. 1, the profile for sprocket 40 will be designed in view of the span from crankshaft 24 to sprocket 40 while the profile for sprocket 32 will be designed in view of the span from sprocket 32 to sprocket 40 and thus the two profiles will differ.

It should also be noted that the present invention is not limited to use with DOHC engines, and the present invention can also be advantageously employed with V6 engines, or the like, with single cams, whether in overhead cam configurations or in push rod configurations.

While tests of V6 engines employing one or more appropriately designed non-circular sprockets 100 show a significant reduction in 1.5 order torsional vibrations, the present inventor has determined that it is also possible to reduce vibrations at multiples of the 1.5 order. Specifically, $3^{rd}$ order vibrations can be reduced along with the 1.5 order vibrations if the sprocket or sprockets are designed to also include an appropriate second profile.

As mentioned above, to reduce 1.5 order vibration sprockets 100 are designed with a radial profile having a lobe shape that is repeated three times around the circumference of sprocket 100. In order to reduce $3^{rd}$ order vibration, a second profile, having a lobe shape that is repeated six times around the circumference of sprocket 100, is also included. This second, six-lobed, profile is overlaid on the above-mention three-lobed profile to obtain a composite profile. This second profile is determined, as discussed in the above-mentioned PCT application, and serves to create corrective torque to offset the torque causing the $3^{rd}$ order vibrations.

If the out of round difference (the position about the sprocket at which the high and low points of the lobes of each profile must be located) between the profiles is large, the resulting composite profile can appear to have three large and three smaller lobes. If the out of round difference between the profiles is small, the composite profile will appear to have just three lobes, albeit with a different shape that a profile for canceling a single order torsional vibration. The out of round difference between the profiles depends upon the physical specifics of the location and geometry of the components of the synchronous drive.

Figure 6:
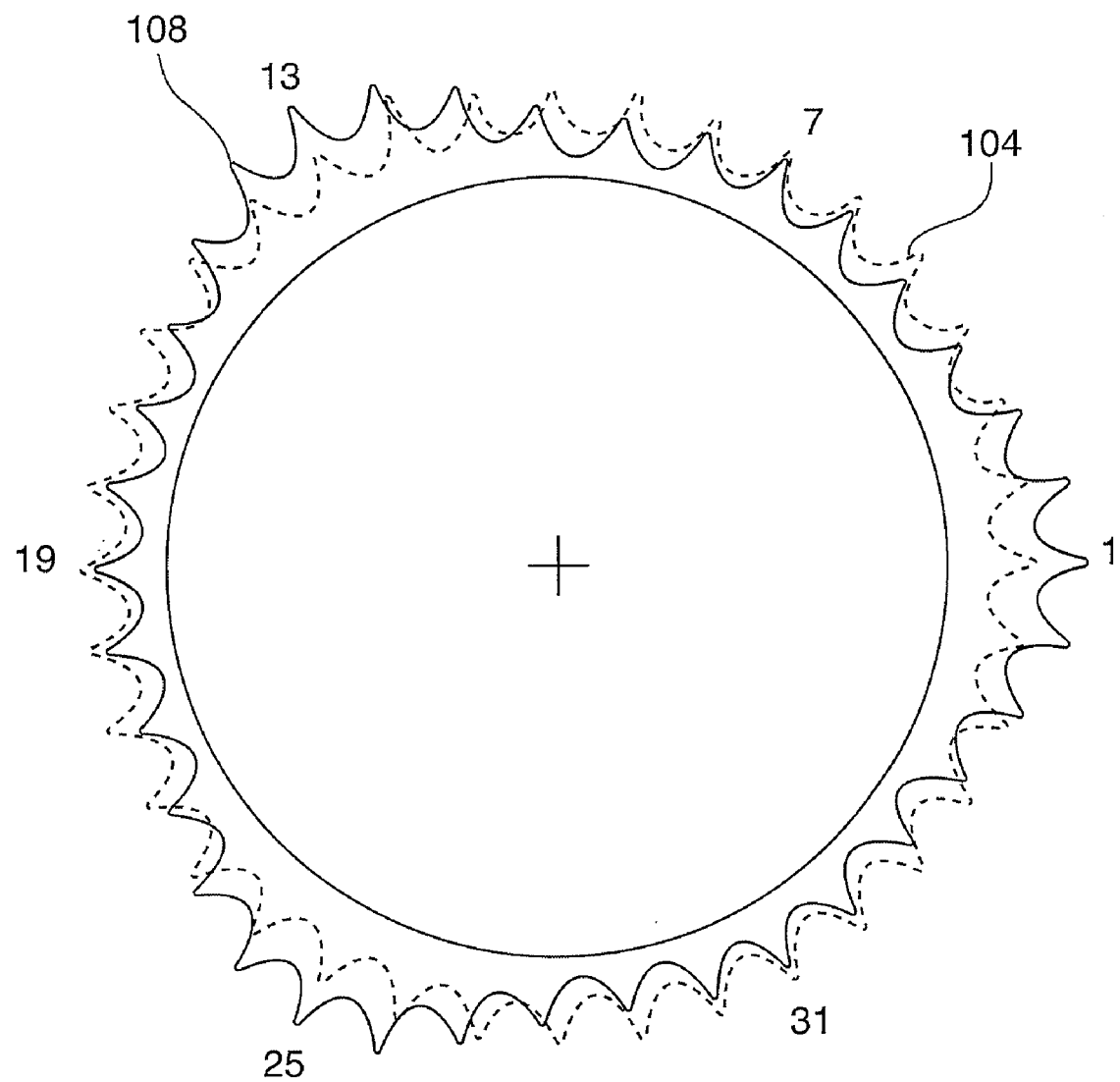
FIG. 6 shows the profile of the teeth of a sprocket, in accordance with the present invention with two non-circular profiles overlaid on the profile of the teeth a conventional socket.

FIG. 6 shows the profile of the teeth of a thirty-six tooth sprocket 108, shown in solid line, constructed in accordance with the present invention. In the figure, the inventive sprocket 108 is overlaid on the profile of the teeth of a conventional thirty-six tooth sprocket 104, shown in dashed line. Where the continuous loop elongate structure is a belt, I have determined that in most situations the difference in the radial distance between any point on the profile of the inventive sprocket 108 and the profile of a conventional sprocket 104 can be less than or equal to 1.5 mm. Where the continuous loop elongate structure is a chain, I have determined that in most situations the difference in the radial distance between any point on the profile of the inventive sprocket 108 and the profile of a conventional sprocket 104 can be less than or equal to 1.0 mm.

As can be seen, the profile of sprocket 108 has a general three-lobe shape with three smaller lobes, centered around teeth 7, 19 and 31, located between the three larger lobes that are centered on teeth 1, 13 and 25.

The smaller lobes centered at teeth 7, 19 and 31 correspond to three lobes of the six lobed profile to reduce $3^{rd}$ order vibrations, and the much different profile of each of the lobes centered at teeth 1, 19 and 25 result from the addition of the three remaining lobes of the profile to reduce $3^{rd}$ order vibrations with the three lobes of the profile to reduce 1.5 order vibrations. Specifically, in the composite profile of the three large lobes centered about teeth 1, 13 and 25, the two teeth adjacent each side of teeth 1, 13 and 25 respectively (e.g. Teeth 11, 12, 14 and 15 about tooth 13, etc.) have a much different profile from those same teeth on sprocket 100.

Figure 7:
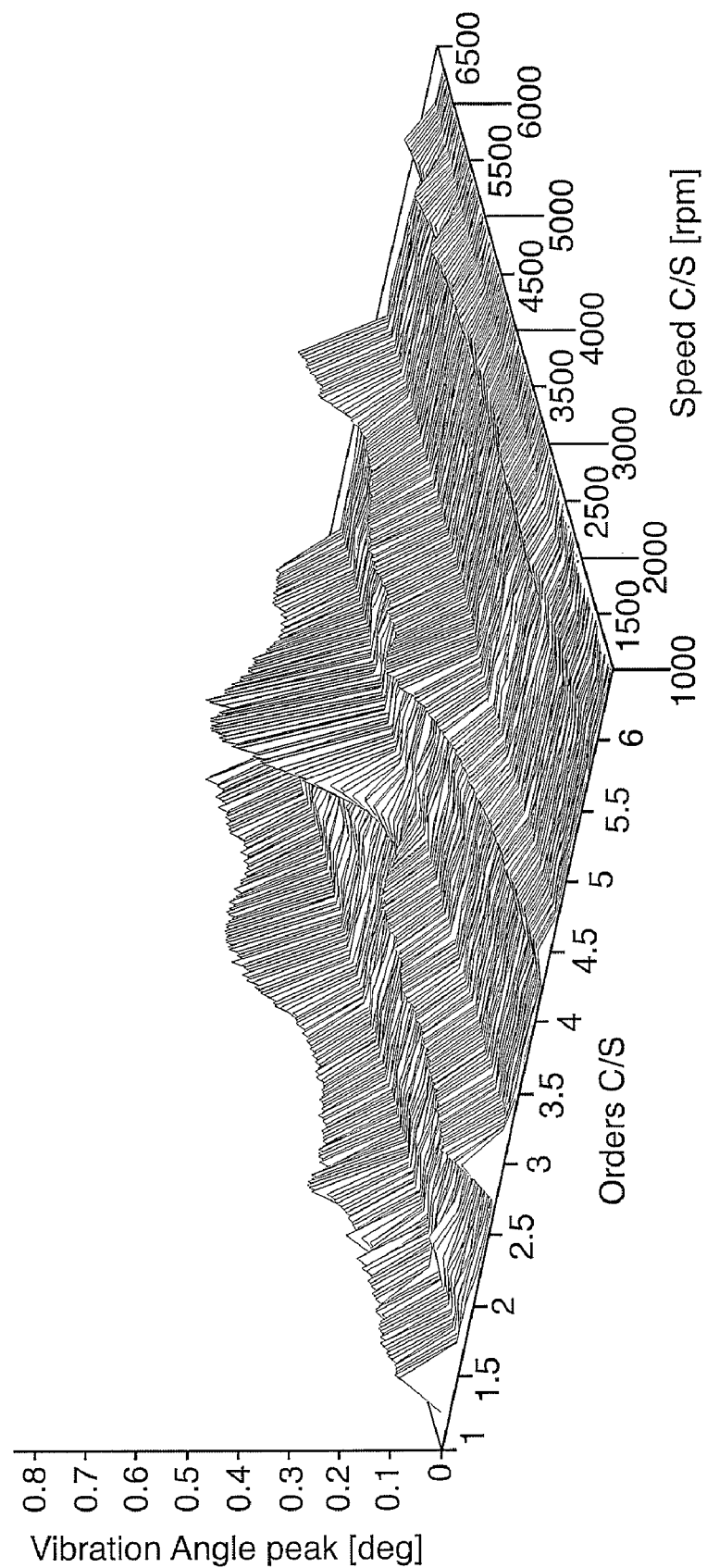
FIG. 7 shows a Fourier Waterfall graph of the torsional vibrations at a camshaft of the V6 engine of FIG. 3 when the camshaft sprockets have been replaced with sprockets constructed in accordance with the teachings of the present disclosure.

FIG. 7 shows the results of employing sprockets 108 in the V6 engine tested for FIG. 3. The significant reduction in vibrations at the 1.5 order and the $3^{rd}$ order can clearly be seen in the Figure.

As will be apparent to those of skill in the art, vibrations at higher multiples of the 1.5 order, such as 4.5 order, can also be reduced in a similar manner if sprocket 108 is large enough, i.e. has enough teeth, that additional profiles can also be included. To reduce 4.5 order vibrations, a profile with a lobe that is repeated nine times is required to be overlaid with the three-lobed and six-lobed profiles to form the required composite non-circular profile. In most internal combustion engines, sprockets in synchronous drives typically do not have enough teeth to allow formation of such a set of profiles, but if such a sprocket is large enough, the present invention can be employed therewith to reduce higher multiple vibrations.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:
1. A synchronous drive apparatus comprising:
a plurality of rotors including a driving rotor, a first driven rotor and a second driven rotor, the first driven rotor being adapted to be coupled to a first shaft that when rotated is configured to transmit to the first driven rotor a first periodic fluctuating load torque, the second driven rotor being adapted to be coupled to a second shaft that when rotated is configured to transmit to the second driven rotor a second periodic fluctuating load torque;

a continuous loop elongate drive structure that is engaged to the plurality of rotors to transmit rotary power from the driving rotor to the first driven rotor and the second driven rotor;

wherein the first driven rotor comprises a first non-circular profile having a plurality of first lobes arranged about the first non-circular profile so as to cooperate with the continuous loop elongate drive structure to apply a first opposing fluctuating corrective torque to the first driven rotor that at least partly counteracts the first periodic fluctuating load torque;

wherein the second driven rotor comprises a second non-circular profile having a plurality of second lobes arranged about the second non-circular profile so as to cooperate with the continuous loop elongate drive structure to apply a second opposing fluctuating corrective torque to the second driven rotor that at least partly counteracts the first periodic fluctuating load torque; and wherein the first non-circular profile is different from the second non-circular profile.

2. The synchronous drive apparatus of claim 1, wherein the continuous loop elongate drive structure includes a first portion, which is disposed between the first driven rotor and a first different one of the plurality of rotors that is adjacent the first driven rotor, wherein the first non-circular profile is such as to produce the first opposing fluctuating corrective torque by periodic elongation and contraction of the first portion of the continuous loop elongate drive structure, and wherein the angular position of the first non-circular profile is within +/−15 degrees of an angular position for which a maximum elongation of the first portion of the continuous loop elongate drive structure coincides with a peak value of the first fluctuating load torque.

3. The synchronous drive apparatus of claim 2, wherein the angular position of the first non-circular profile is within +/−5 degrees of the angular position for which the maximum elongation of the first portion of the continuous loop elongate drive structure coincides with the peak value of the first fluctuating load torque.

4. The synchronous drive apparatus of claim 3, wherein the angular position of the first non-circular profile substantially coincides with the angular position for which the maximum elongation of the first portion of the continuous loop elongate drive structure coincides with the peak value of the first fluctuating load torque.

5. The synchronous drive apparatus of claim 2, wherein the continuous loop elongate drive structure includes a second portion that is disposed between the second driven rotor and a second different one of the plurality of rotors that is adjacent the second driven rotor, wherein the second non-circular profile is such as to produce the second opposing fluctuating corrective torque by periodic elongation and contraction of the second portion of the continuous loop elongate drive structure, and wherein the angular position of the second non-circular profile is within +/−15 degrees of an angular position for which a maximum elongation of the second portion of the continuous loop elongate drive structure coincides with a peak value of the second fluctuating load torque.

6. The synchronous drive apparatus of claim 5, wherein the angular position of the second non-circular profile is within +/−5 degrees of the angular position for which the maximum elongation of the second portion of the continuous loop elongate drive structure coincides with the peak value of the second fluctuating load torque.

7. The synchronous drive apparatus of claim 6, wherein the angular position of the second non-circular profile substantially coincides with the angular position for which the maximum elongation of the second portion of the continuous loop elongate drive structure coincides with the peak value of the second fluctuating load torque.

8. The synchronous drive apparatus of claim 1, wherein the first non-circular profile is such that the first fluctuating corrective torque has an amplitude in the range of 70% to 110% of the amplitude of the first fluctuating load torque at a predetermined selected set of operating conditions of the synchronous drive apparatus.

9. The synchronous drive apparatus of claim 8, wherein the range of the amplitude of the first fluctuating corrective torque consists of 90% to 100% of the amplitude of the first fluctuating load torque.

10. The synchronous drive apparatus of claim 9, wherein the amplitude of the first fluctuating corrective torque is equal to the amplitude of the fluctuating load torque.

11. The synchronous drive apparatus of claim 8, wherein the second non-circular profile is such that the second fluctuating corrective torque has an amplitude in the range of 70% to 110% of the amplitude of the second fluctuating load torque at the predetermined selected set of operating conditions of the synchronous drive apparatus.

12. The synchronous drive apparatus of claim 11, wherein the range of the amplitude of the second fluctuating corrective torque consists of 90% to 100% of the amplitude of the second fluctuating load torque.

13. The synchronous drive apparatus of claim 12, wherein the amplitude of the second fluctuating corrective torque is equal to the amplitude of the fluctuating load torque.

14. The synchronous drive apparatus of claim 1, wherein the first non-circular profile comprises a plurality of first teeth, each first tooth having a first crown and each pair of adjacent first teeth having a first valley therebetween, the first crowns of the first teeth lying on a curved envelope forming a perimeter of the first driven rotor, wherein the distance between the midpoints of the first crowns of each pair of adjacent first teeth is substantially the same and the distance between the midpoint of each first crown and a rotational axis of the first driven rotor varies around the perimeter of the first driven rotor to produce the first non-circular profile.

15. The synchronous drive apparatus of claim 14, wherein for each first tooth the orientation of the first valley on one side of the first tooth relative to the first valley on the other side of the first tooth taken about the midpoint of the first crown of the first tooth varies around the perimeter of the first driven rotor to produce the first non-circular profile.

16. The synchronous drive apparatus of claim 14, wherein the second non-circular profile comprises a plurality of second teeth, each second tooth having a second crown and each pair of adjacent second teeth having a second valley therebetween, the second crowns of the second teeth lying on a curved envelope forming a perimeter of the second driven rotor, wherein the distance between the midpoints of the second crowns of each pair of adjacent second teeth is substantially the same and the distance between the midpoint of each second crown and a rotational axis of the second driven rotor varies around the perimeter of the second driven rotor to produce the second non-circular profile.

17. The synchronous drive apparatus of claim 14, wherein for each second tooth the orientation of the second valley on one side of the second tooth relative to the second valley on the other side of the second tooth taken about the midpoint of the second crown of the second tooth varies around the perimeter of the second driven rotor to produce the second non-circular profile.

* * * * *